United States Patent [19]

Arnold, Sr. et al.

[11] Patent Number: 5,099,602
[45] Date of Patent: Mar. 31, 1992

[54] TREE FREEZE PROTECTION AND IRRIGATION SYSTEM

[76] Inventors: John R. Arnold, Sr., 324 E. Par St., Orlando, Fla. 32804; John R. Arnold, Jr., 15625 Jarrell Rd., Clermont, Fla. 34717

[21] Appl. No.: 542,817
[22] Filed: Jun. 25, 1990
[51] Int. Cl.$^5$ .................................................. A01G 17/14
[52] U.S. Cl. ........................................................ 47/47; 47/2
[58] Field of Search ...................... 47/47, 46, 44, 2, 42, 47/43, 48.5; 239/276, 285

[56] References Cited

U.S. PATENT DOCUMENTS

| | | | |
|---|---|---|---|
| 1,058,566 | 4/1913 | Dunlap | 47/2 |
| 1,549,194 | 8/1925 | Gensmer | 239/276 |
| 2,084,817 | 6/1937 | Lombard | 239/276 |
| 2,535,723 | 12/1950 | Coombs | 239/285 |
| 2,631,061 | 3/1953 | Nelson | 239/276 |
| 2,903,190 | 9/1959 | LeDeit | 239/276 |
| 3,345,774 | 10/1967 | Delbuquet | 47/48.5 |
| 3,934,879 | 1/1976 | Curtiss et al. | 47/47 |
| 4,901,955 | 2/1990 | Bynum | 239/276 |
| 4,907,369 | 3/1990 | Vonfell | 47/47 |

Primary Examiner—David A. Scherbel
Assistant Examiner—Michele A. Van Patten
Attorney, Agent, or Firm—William M. Hobby, III

[57] ABSTRACT

A tree freeze protection and irrigation system includes a support stand having a plurality of prongs and having a foot step positioned between two said prongs for driving the support stand into the earth adjacent to a tree. The support stand has a water line coupling for attaching a water line thereto and has a passageway therethrough. A rigid pipe is removably attached at one end to the support stand and coupled to the passageway through the support stand and extends in a generally vertical direction when the prongs are anchored in the earth. A spray head is attached on the other end of the rigid pipe for dispersion of the water over a tree. Tree attaching members are provided for attaching the rigid pipe to an adjacent tree so that a free protection and irrigation system can spray a liquid directly above and onto a tree like a shower nozzle. The rigid pipe may include a plurality of rigid pipe sections for varying the length of the rigid pipe in accordance with the height of the tree. The stand may have two or four prongs, may have a shut-off valve, and may include a T-connector along with reinforcing angled brace members supporting the upright coupling portion for holding the rigid pipe.

12 Claims, 3 Drawing Sheets

TREE FREEZE PROTECTION AND IRRIGATION SYSTEM

BACKGROUND OF THE INVENTION

The present invention relates to a freeze protection and irrigation system for individual trees and especially to freeze protection system which can be supported in the earth adjacent a tree and has a rigid pipe extending to just above the tree for spraying water onto the tree.

In the past, it has been common to provide a wide variety of systems for protecting orchard trees, such as citrus trees, from occasional freezing temperatures which can damage the fruit and kill the tree. The most common system is probably to cover the trees to protect the plants from frost while providing heaters under the cover or, alternatively, providing irrigation water under the tree covers. There have also been systems for insulating tree trunks with wrapped insulating material and for pumping steam or heat into a grove under each tree and for using large wind machines to move the warmer air into colder pockets. At one time it was common to use smudge pots placed in citrus groves in order to produce heat and a cloud cover to protect the trees during short cold spells but this produced considerable pollution harmful to humans and animals and this has been widely discontinued. A large number of freeze protection systems enclose the tree foliage in large plastic or cloth covers and, in some cases, a covered framework encloses the tree. These systems sometimes require elaborate means to get the covering material over the tree foliage especially on larger trees and they are sometimes used in conjunction with heating systems.

It has become common in recent years to turn on sprinklers during freezing weather to continuously sprinkle citrus trees so that the water covering the foliage freezes and the foliage and limbs become covered with ice. The ice then acts as insulation for the foliage. The ice is held at a constant 32° F., so the foliage and limbs are held at this temperature which is safe for the foliage and prevents the surrounding temperature, which may drop well below the 32 degrees from damaging the trees. This system has sometimes been accomplished with overhead tree sprinkler systems using rotary sprinkler heads covering a wide area. This has the disadvantage that the tree foliage is not uniformly and evenly covered and, in addition, freezing temperatures are frequently accompanied by high winds which tend to further reduce the coverage of the sprinkler head.

The present invention is directed towards a freeze protection system for citrus trees and the like for spraying the tree during freezing weather to insulate the trees and foliage from dropping much below the 32° F. temperature level and includes a multiprong stand with a vertically extended rigid pipe having a specially designed sprinkler head on the top to spray the tree from over the foliage using low pressure water from an irrigation system. The rigid vertical pipes attached to the stands can be attached to the tree for stability and can be extended with pipe sections to any height desired. The multiprong stand portion has a step for driving the stand into the earth and can be rapidly attached to a tree and connected to an exiting irrigation system.

Prior U.S. patents which shows either a frost prevention system which sprays water above trees or an irrigation system which sprays water over the trees in a citrus or other grove or orchid or a combination of the two can be seen in the U.S. Pat. No. 3,563,461 to Cole, Jr.; the Dunlap U.S. Pat. No. 1,058,566; the Huffaker U.S. Pat. No. 1,846,395; the Hammell U.S. Pat. No. 1,991,851; the Darr U.S. Pat. No. 3,314,191; the Day U.S. Pat. No. 4,614,055; the Lilly U.S. Pat. No. 4,651,465; the James U.S. Pat. No. 4,763,440; the Heenan et al. U.S. Pat. No. 3,825,186; and the Lloyd U.S. Pat. No. 1,632,611. The Cole patent connects an irrigation pipe adjacent to a tree to be protected and telescopes up to any height to extend just above the tree to spray the tree. The Dunlap patent runs a rigid pipe directly up into the tree adjacent the tree trunk for spraying the tree. The Hammell patent has a special spray head while the Lilly patent runs a rigid pipe through some insulation adjacent a tree trunk and then has a special spray head for spraying over the tree for protecting the plant from freeze damage. The James patent has a screened enclosure for the plants and sprays them to prevent freeze damage. The Nelson U.S. Pat. No. 2,631,061; the Schwartz U.S. Pat. No. 3,599,917; the Villelli U.S. Pat. No. 4,095,744; the Clark U.S. Pat. No. 2,852,307; the Miller et al. U.S. Pat. No. 2,711,927; and the Richey U.S. Pat. No. 2,694,600 each show stands for vertical pipes or for sprinkler heads and each provided with multiprongs or a single prong and a foot step for driving the stem into the ground. These patents, however, are primarily for sprinkler systems for yards or irrigation which can be rapidly moved from place to place and supported in the ground to sprinkle a particular area. The Nelson patent however has a pair of ground insertion prongs with a foot step which also acts to block the stand from going too deep into the ground.

In contrast, the present invention is designed for rapidly converting an existing underground irrigation system into a freeze protection system which can also be used to irrigate the trees but allows a water pipe to be rapidly inserted adjacent a tree and supported on the tree to extend to just above the tree. It is directed directly over the tree for uniform even coverage and the existing irrigation system can be rapidly connected to the stand to supply water to the freeze protection system.

SUMMARY OF THE INVENTION

A tree freeze protection and irrigation system includes a support stand having a plurality of prongs and having a foot step positioned between two said prongs for driving the support stand into the earth adjacent a tree. The support stand has a water line coupling for attaching a water line thereto and has a passageway therethrough. A rigid pipe is removably attached at one end to the support stand and coupled to the passageway through the support stand and extends in a generally vertical direction when the prongs are anchored in the earth. A spray head is attached on the other end of the rigid pipe for dispersion of the water over a tree. Tree attaching members are provided for attaching the rigid pipe to an adjacent tree so that a freeze protection and irrigation system can spray a liquid directly over a tree. The rigid pipe may include a plurality of rigid pipe sections for varying the length of the rigid pipe in accordance with the height of the tree. The stand may have two or four prongs, may have a shut-off valve, and may include a T-connector along with reinforcing angled brace members supporting the upright coupling portion for holding the rigid pipe.

BRIEF DESCRIPTION OF THE DRAWINGS

Other objects, features, and advantages of the present invention will be apparent from the written description and the drawings in which.

DETAILED DESCRIPTION OF THE PREFERRED EMBODIMENTS

Figure 1:
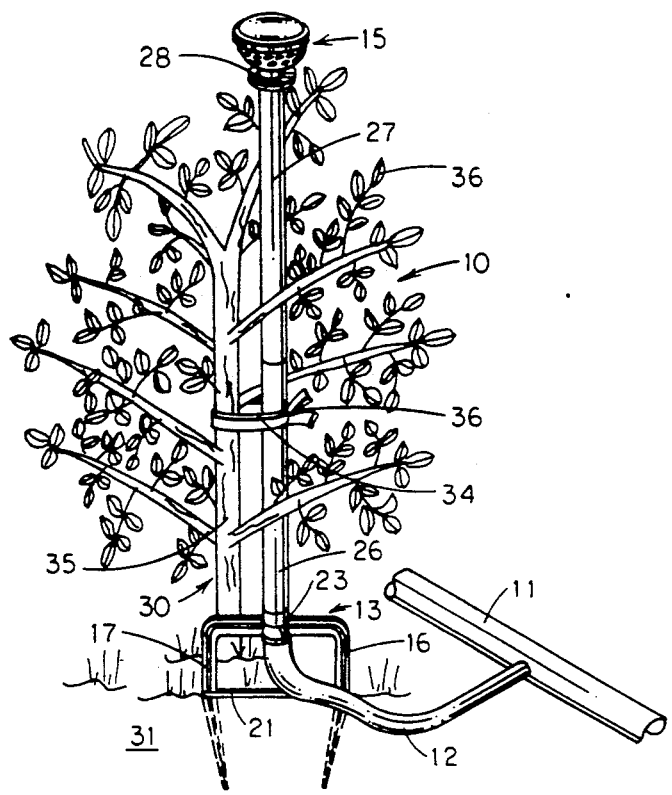
FIG. 1 is a perspective view of an orchard tree having the present freeze protection system connected thereto.
Figure 2:
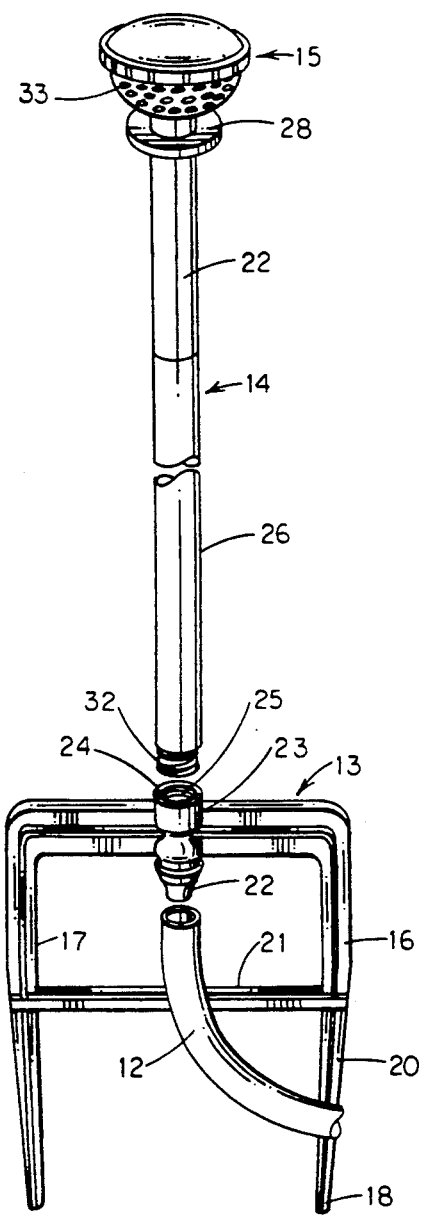
FIG. 2 is a perspective view of one embodiment of a stand for use in the freeze protection system of FIG. 1.
Figure 3:
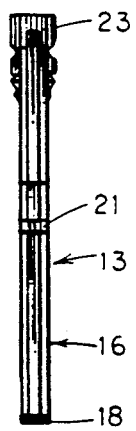
FIG. 3 is a side elevation of the ground support stand portion of FIG. 2.
Figure 4:
FIG. 4 is a top plan view of the stand of FIGS. 2 and 3.

Referring to FIGS. 1-4 of the drawings, a freeze protection and irrigation system 10 is illustrated connected to an unexisting underground irrigation pipe 11 through a flexible spaghetti tube 12 which normally connects to a microjet irrigation system. The freeze protection system includes a stand 13, upright extending rigid pipe 14, and a spray nozzle 15 attached to the top thereof. The stand 13 has a pair of earth insertion prongs 16 and 17 having generally pointed tips 18 and formed of four connected ridge portions 20. A center step 21 between the two prongs 16 and 17 provides a convenient place for placing the foot for driving a stand into the earth as shown in FIG. 1 and also acts as a stop to prevent the stand 13 from protruding all the way into the earth where it would be hard to attach the flexible tube 11 to the tube coupling portion 22. The tube coupling portion 22 has the rigid pipe 14, coupling portion 23 having internal threads 24 therein. A passageway protrudes through the stand 13 between coupling 22 and the water outlet 25. The rigid tube 14 may include a plurality of pipe sections 26 and 27 for extending the rigid pipe 14 to any height desired to bring the rigid pipe end portion 28 to just above the orchid tree 30. The stand 13 is shown driven into the ground 31, in FIG. 1, having the rigid pipe section 26 with the external threads 32 threaded into the internal threads 24 of the stand 13 and having the pipe section 26 and 27 threaded together to extend the length of the rigid pipe 14. A sprinkler head 15 is shown attached in the top 28 of the pipe section 27 and is directed towards receiving the flow therein and directing the flow out a plurality of small apertures 33 facing downward and outward to distribute a light spray over the citrus tree 30 for an even distribution from a low pressure irrigation system 11. Attaching means 34 are shown attached around the rigid pipe 14 and around the trunk 35 of the tree 30. More than one of these straps 34 can be utilized and may include a VELCRO fastening portion 36 for rapidly strapping the pipe 14 to the tree 35. The rigid pipe 14, especially when made in greater lengths, is thus supported by the stand prongs 16 and 17 driven into the earth 31 but which would not give sufficient strength to prevent a long extending rigid pipe 14 from shifting from adjacent the tree so that the fastening member 34 not only holds the pipe from falling over but extends the pipe right up the center of the tree and over the foliage 36. It should be clear that the system can be rapidly installed into a grove of citrus trees or the like by merely attaching the rigid pipe section 26 to the stand 13 and additional pipe sections 27 can be added to extend the length as desired. The stand portions 13 may be driven into the earth, as shown in FIG. 1, adjacent the tree trunk 35 and the pipe attached with a strap 34 to hold the rigid pipe 14 to the tree trunk 35 with a sprinkler head 15 extending just above the tree foliage 36. The irrigation pipe 11 is connected through its existing spaghetti tubing 12 or other tubing as desired to the coupling 22 so that when the irrigation system 11 is turned on, the water will exit in a fine spray from the nozzle 15 directly over the tree.

Figure 5:
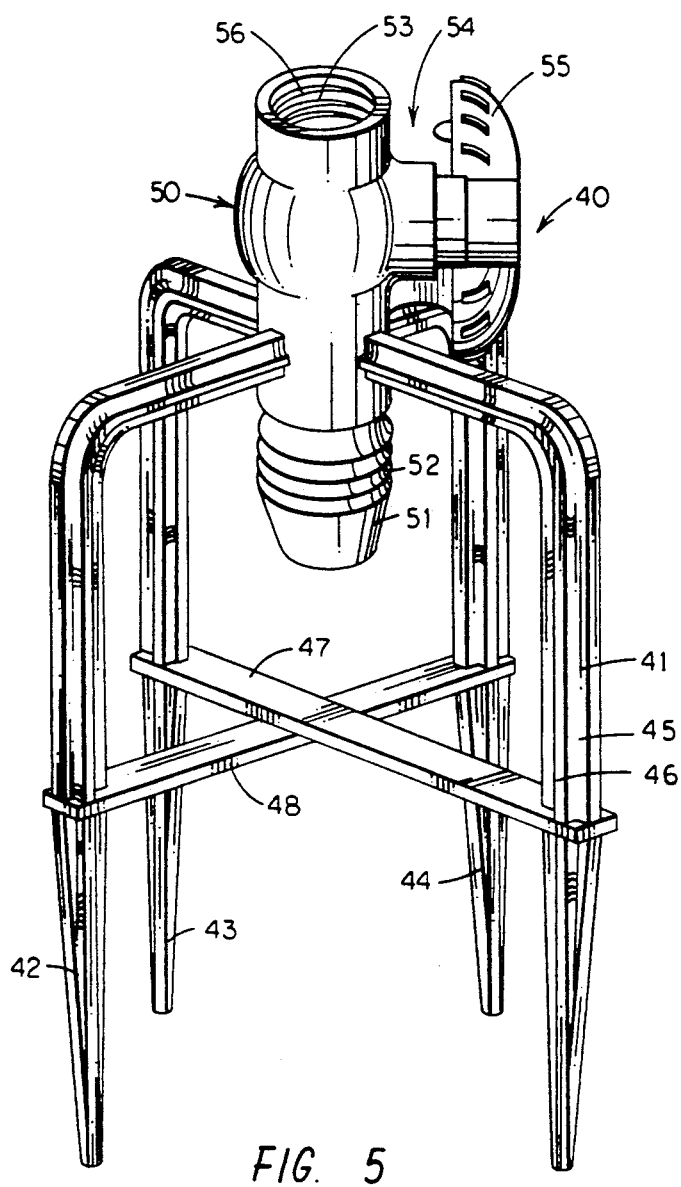
FIG. 5 is an alternate embodiment of an irrigation pipe supporting stand having four legs and a cutoff valve.
Figure 6:
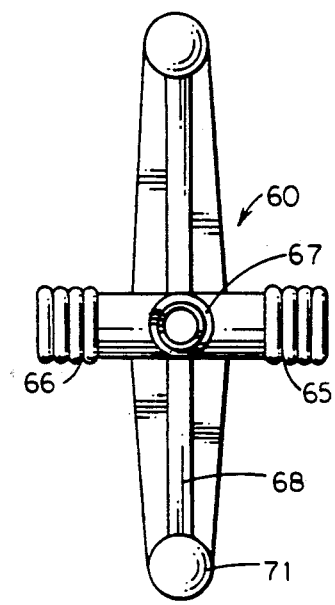
FIG. 6 is a top plan view of the stand of FIG. 5.

Turning to FIGS. 5 and 6, a second embodiment of the stand portion 13 of FIGS. 1-4 is illustrated in the stand 40 having four earth prongs 41, 42, 43, and 44 each made up of intersecting ridges 45 and 46. The prongs 41 and 43 are connected by a member 47 which can be used as a foot step and also to stop the insertion of the prongs into the earth beyond that point. The earth prongs 42 and 44 are similarly connected by a cross bar 48. The prongs 41, 42, 43, and 44 are each connected to a coupling member 50 which has a bottom pipe coupling 51 having a plurality of annular ridges 52 for clamping a flexible irrigation tube directly thereto. Passageway 53 passes through the coupling 50 and through a valve portion 54 having a valve handle 55 so that the water passing therethrough can be turned on and off by turning the valve handle 55. A plurality of internal threads 56 allows the rigid pipe 14 to be attached thereto.

Figure 8:
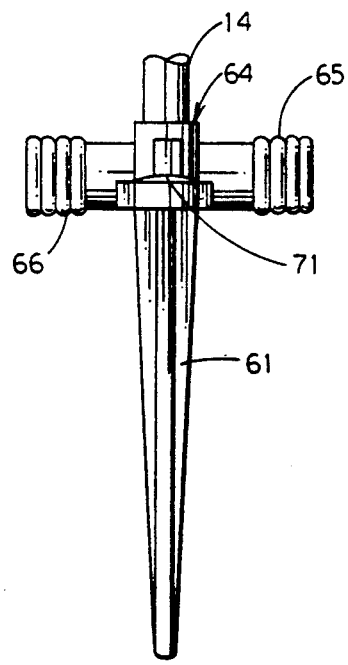
FIG. 8 is a side elevation of the pipe stand of FIG. 7.
Figure 7:
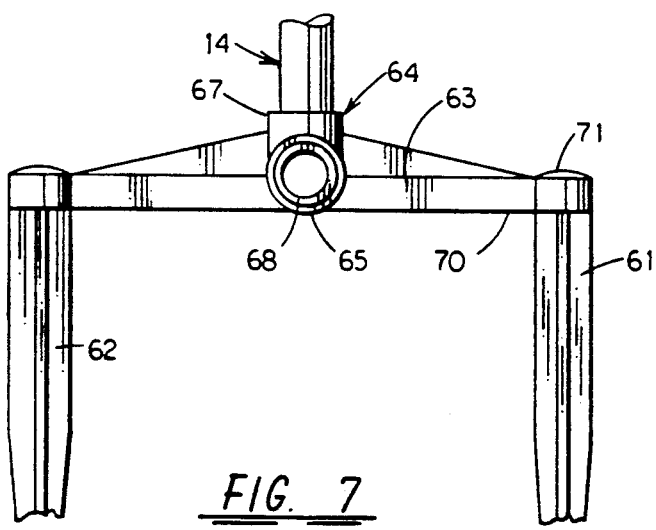
FIG. 7 is a side elevation of a third embodiment of a pipe stand in accordance with the present invention.

Turning now to FIGS. 6, 7 and 8, another embodiment of a stand 60 in accordance with the present freeze protection system is illustrated having two earth insertion prongs 61 and 62 connected to a cross support member 63 to a T-connector 64. The T-connector provides a coupling 65 on one side and a coupling 66 on the other side, each having a plurality of annular ridges for clamping each side of an irrigation pipe thereto. The T-connector has an upstanding coupling portion 67 and has a plurality of threads 68 therein for attaching the upright rigid pipe portion 14 thereto. This embodiment can be driven all the way into the earth until the earth contacts the bottom 67 of the cross member 63 inasmuch as the pipes are connected to either side rather than to the bottom of the stand 60. In addition, a pair of reinforcing angled brace members 68 are attached to the cross member 63 and to the side of the upright coupling portion 67 of the t-coupling 64 to add greater strength to the coupling against breakage by a long vertical rigid pipe member 14. A pair of cap portions 71 are mounted on top of each earth insertion prong 61 and 62 and can be used to drive the prongs in with a mallet or to support a foot placed on the top of the prongs.

Figure 9:
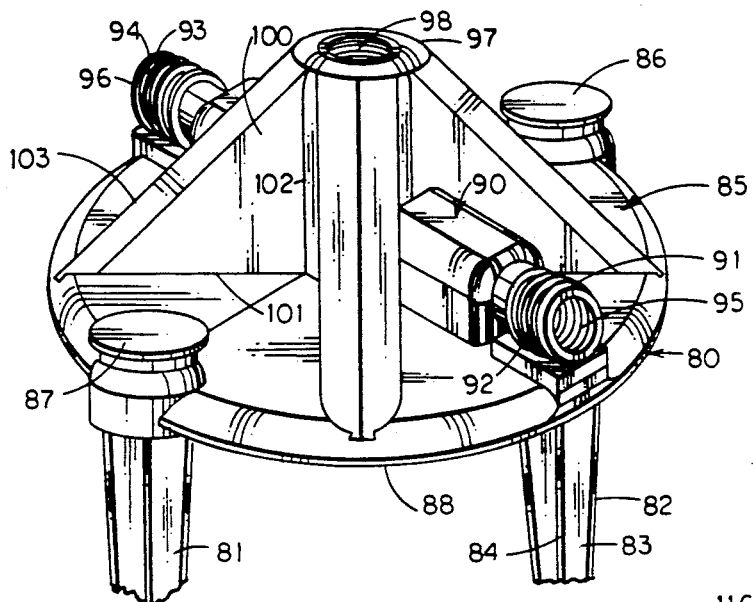
FIG. 9 is a perspective view of a fourth embodiment of the freeze protection pipe earth support stand in accordance with the present invention.
Figure 10:
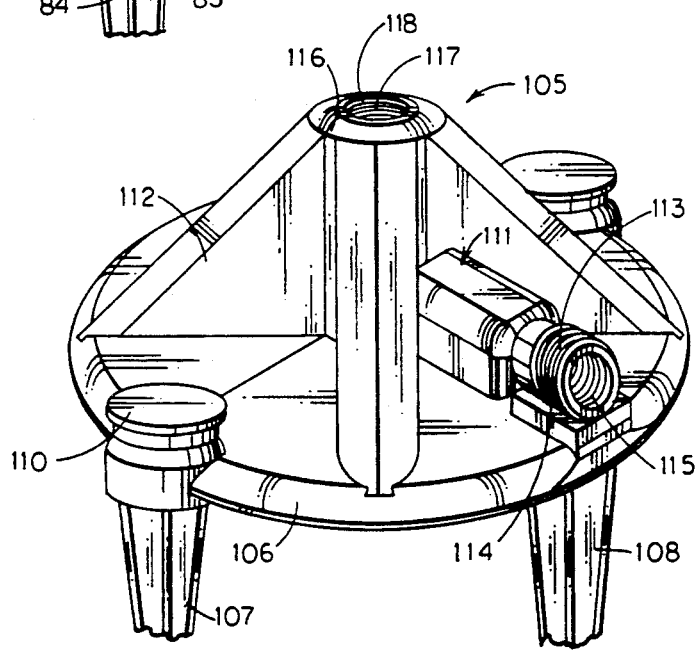
FIG. 10 is a perspective view of a modified embodiment of the stand of FIG. 9.

Referring to FIGS. 9 and 10, two related embodiments are illustrated in which a stand 80 in FIG. 9 has a pair of earth prongs 81 and 82 thereon each having intersecting ridges 83 and 84 and tapering to a pointed prong. Each prong 81 and 82 is connected to a base portion 85 and prong 82 has a driving cap 86 thereover while prong 81 has a driving cap 87 thereover for driving the stand into the ground with a mallet or the like if desired. The stand is driven into the ground until the floor 88 of the base 85 contacts the ground for additional support from the earth. The stand 80 has a T-connector 90 formed on top of the base 85 and has a coupling 91 having a plurality of annular ridges 92 on one end and a coupling 93 having a plurality of annular ridges 94 on the other end thereof. Tubes or pipes can be slid over the couplings 91 and 93 and clamped with standard stainless steel clamps. The opening 95 passes through the T-connector to an outlet 96 at the other end and also into the upstanding T-connector portion 97 which has a plurality of internal threads 98 for attaching a rigid vertically extending pipe 14. Four brace members 100 are formed into the stand 80 and are generally triangular shaped having one side 101 formed into the base 85, another edge 102 formed and attached to the upstanding T-connector portion member 97 with a third leg 103 of the triangular brace 100 extending across to the edge of the base 85 to provide a rigid support to the upstanding member 97 so that a rigid pipe 14 of any length attached to the threads 98 will not easily break off the T-connector portion 97 by the rigid pipe 14 which will be directed through the brace members 100 to the tops of the base portion 85 and then against the adjacent earth.

Referring to FIG. 10, a slightly modified pipe stand 105 is similar to the stand of FIG. 9 having a base portion 106 having a pair of prongs 107 and 108 attached thereto and each having a driving cap 110 over the prong. In this embodiment, an L-connector 111 is formed into the stand 105 and has a plurality of triangular shaped braces 112 similar to the braces 100 of FIG. 9. The L-connector 111 has a coupling portion 113 having a plurality of annular ridges 114 for clamping a pipe or tube thereover and a passageway opening 115. The upright portion 116 of the L-connector 111 has the outlet opening 117 and a plurality of internal threads 118 therein. This then would typically be the last sprinkler in an irrigation line which would not require a continuing water line coupling such as 93 in FIG. 9, but which otherwise operates in the identical manner to the stand of FIG. 9.

It should be clear at this point that a tree freeze protection irrigation system has been provided which has a stand portion for rapidly driving into the earth adjacent a citrus tree or the like to be protected from freezing weather and includes a rigid pipe extending therefrom to a level just above the tree and supported to the tree with a supporting strap or the like and is specifically designed to rapidly attaching adjacent to a tree and connecting to an existing irrigation system. In addition to protecting the tree from freeze, this system can also be used for irrigating the tree as well as for the application of insecticides, liquid fertilizer, or the like. Accordingly, the present invention is not to be construed as limited to the forms shown which are to be considered illustrative rather than restrictive.

I claim:

1. A tree freeze protection and irrigation system comprising:

a support stand having a plurality of prongs and having a foot step between two said prongs for driving said support stand into the earth adjacent a tree, said support stand having a water line coupling for removably attaching a flexible waterline thereto and said support stand having a passageway therethrough;

a plurality of rigid pipes removably attached to each other and one said rigid pipe being removably attached at one end to said support stand and coupled to the passageway in said support stand and extending in a generally vertical direction when said support stand is attached in the earth;

a spray head attached to the other end of the rigid pipe for dispersion of water over a tree; and tree attaching means for attaching said rigid pipe to an adjacent tree, said tree attaching means including a VELCRO strap for attaching said rigid pipe to the trunk of a tree for holding said rigid pipe to said tree, whereby a tree freeze protection and irrigation system can spray a liquid direction over a tree.

2. A tree freeze protection and irrigation system in accordance with claim 1 in which said support stand has two tapered prongs for driving the support stand into the earth adjacent a tree.

3. A tree freeze protection and irrigation system in accordance with claim 1 in which said support stand has four tapered earth prongs extending therefrom for driving into the earth adjacent a tree.

4. A tree freeze protection and irrigation system in accordance with claim 1 in which said support stand has a cutoff valve formed therein for cutting off the water to said spray head.

5. A tree freeze protection and irrigation system in accordance with claim 1 in which a cross brace is connected between a pair of said prongs to stop the insertion of the prongs into the earth at a predetermined point, said cross support also forming a foot step for driving the prongs into the ground.

6. A tree freeze protection and irrigation system in accordance with claim 1 in which said support stand has a T-connector formed therein providing a coupling for an upright rigid pipe and irrigation water line input and output connections.

7. A tree freeze protection and irrigation system in accordance with claim 1 in which said support stand has a bottom coupling for attaching a flexible tube from a microjet irrigation system to said support stand.

8. A tree freeze protection and irrigation system in accordance with claim 1 in which said tree attaching means strap has VELCRO connectors for rapidly connecting said strap around said rigid pipe and tree trunk.

9. A tree freeze protection and irrigation system comprising:

a support stand having a plurality of prongs and having means for driving said support stand into the earth adjacent a tree, said means including a drive surface formed on the top thereof for driving said support stand prongs into the earth with a mallet or the like and said support stand having a vertically extending pipe coupling member and a water line coupling for removably attaching a flexible waterline thereto and said support stand also having a passageway therethrough and through said pipe coupling member and said support stand having a plurality of brace members attached to said pipe coupling member for support thereof;

a rigid pipe removably attached at one end to said support stand pipe coupling member and coupled to the passageway in said support stand and extending in a generally vertical direction when said support stand is attached in the earth;

a spray head attached to the other end of said rigid pipe for dispersion of water over a tree; and tree attaching means for attaching said rigid pipe to an adjacent tree, said tree attaching means including a strap for attaching said rigid pipe to the trunk of a tree for holding said rigid pipe to said tree, whereby a tree freeze protection and irrigation system can spray a liquid direction over a tree.

10. A tree freeze protection and irrigation system in accordance with claim 9 in which a plurality of rigid pipes are attached to each other to extend the length of said rigid pipe extending in a generally vertical direction adjacent a tree.

11. A tree freeze protection and irrigation system in accordance with claim 9 in which said support stand has an L-coupling formed therein.

12. A tree freeze protection and irrigation system in accordance with claim 9 in which said supporting braces are triangular shaped and attach to a generally disc shaped base along one side thereof and are attached along a second side thereof to the upright rigid pipe coupling portion of said support stand.

* * * * *